(12) United States Patent
Utagawa (10) Patent No.: US 8,045,048 B2
(45) Date of Patent: Oct. 25, 2011

(54) FOCUS DETECTION DEVICE, FOCUS DETECTION METHOD, AND IMAGE PICKUP APPARATUS

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 424 days.

(21) Appl. No.: 12/267,665

(22) Filed: Nov. 10, 2008

(65) Prior Publication Data

US 2009/0174807 A1    Jul. 9, 2009

(30) Foreign Application Priority Data

Nov. 12, 2007    (JP) ................................ 2007-292881

(51) Int. Cl.
     *H04N 5/232*      (2006.01)
     *H04N 5/228*      (2006.01)
     *G03B 13/00*      (2006.01)
     *G03B 3/10*      (2006.01)

(52) U.S. Cl. ..................... 348/352; 348/208.12; 396/121

(58) Field of Classification Search .................. 348/349, 348/352, 353, 350, 208.12; 396/111, 121
See application file for complete search history.

(56) References Cited

U.S. PATENT DOCUMENTS

| | | | |
|---|---|---|---|
| 5,664,236 A * | 9/1997 | Utagawa ........................ 396/96 |
| 5,729,290 A * | 3/1998 | Tokumitsu et al. ........... 348/349 |
| 6,496,225 B1 * | 12/2002 | Higashihara et al. ......... 348/345 |
| 6,819,360 B1 * | 11/2004 | Ide et al. ....................... 348/340 |
| 7,460,772 B2 * | 12/2008 | Ishikawa et al. ................ 396/52 |
| 7,715,703 B2 * | 5/2010 | Utagawa et al. .............. 396/111 |
| 7,805,067 B2 * | 9/2010 | Utagawa ....................... 396/123 |
| 7,835,636 B2 * | 11/2010 | Yuyama .......................... 396/55 |
| 2008/0277566 A1 | 11/2008 | Utagawa |
| 2009/0027544 A1 * | 1/2009 | Grewal ......................... 348/352 |
| 2009/0135273 A1 * | 5/2009 | Kusaka ....................... 348/222.1 |
| 2009/0174806 A1 * | 7/2009 | Utagawa ....................... 348/345 |
| 2009/0256952 A1 * | 10/2009 | Kusaka ......................... 348/349 |
| 2011/0008031 A1 * | 1/2011 | Kusaka ......................... 396/100 |

FOREIGN PATENT DOCUMENTS

| | | | |
|---|---|---|---|
| JP | 11326743 A | * | 11/1999 |
| JP | 2001203927 A | * | 7/2001 |
| JP | 2004309624 A | * | 11/2004 |
| JP | 2007-011314 | | 1/2007 |
| JP | 2007086107 A | * | 4/2007 |

* cited by examiner

*Primary Examiner* — John Villecco
(74) *Attorney, Agent, or Firm* — Ditthavong Mori & Steiner, P.C.

(57) ABSTRACT

A focus detection device includes a light receiving element, an image shift detection unit, a movement detection unit, and a focus detection unit. The light receiving element receives a pair of light fluxes passing through different regions of a pupil of an optical system. The image shift detection unit detects an image shift amount caused by the pair of light fluxes, based on outputs of the pair of light fluxes received by the light receiving element. The movement detection unit detects an image movement amount caused by the optical system. The focus detection unit detects the focus adjustment state of the optical system by correcting the shift amount detected by the image shift detection unit, with the image movement amount detected by the movement detection unit.

13 Claims, 5 Drawing Sheets

FOCUS DETECTION DEVICE, FOCUS DETECTION METHOD, AND IMAGE PICKUP APPARATUS

CROSS-REFERENCE TO RELATED APPLICATION

The present application is based upon and claims the benefit of priority from prior Japanese Patent Application No. 2007-292881 filed on Nov. 12, 2007 in Japan, the entire contents of which are incorporated herein by reference.

BACKGROUND OF THE INVENTION

1. Field of the Invention

The present invention relates to a focus detection device, a focus detection method, and an image pickup apparatus.

2. Description of the Related Art

There is a known focus detection device that detects a focus adjustment state of an imaging lens by receiving a first image formed with a light flux passing through one of two pupil regions of the subject imaging lens and a second image formed with a light flux passing through the other pupil region by using a solid-state image pickup element, and calculating a shift amount between the first image and the second image (see Japanese Unexamined Patent Publication No. 2007-011314, for example).

However, the conventional focus detection device uses a solid-state image pickup element of CMOS type. Focus detection pixels arranged in a transverse direction of an image capturing screen is the same as a direction of a signal read line of the CMOS image pickup element, but the focus detection pixels arranged in a direction other than the transverse direction of the image capturing screen, such as a longitudinal direction of the image capturing screen, is different from the direction of the signal read line of the CMOS image pickup element. As a result, there is the problem that synchronism in charge storing time cannot be maintained among the focus detection pixels.

Therefore, if there is movement in an image while charge storing is performed on the focus detection pixels arranged in a direction other than the transverse direction of the image capturing screen, image shift is caused between the first image and the second image due to the image movement. As a result, the image shift amount between the first image and the second image cannot be accurately calculated, and the focus detection accuracy is degraded.

SUMMARY OF THE INVENTION

A focus detection device according to the present invention includes: a light receiving element that receives a pair of light fluxes passing through different regions of a pupil of an optical system; an image shift detection unit that detects an image shift amount caused by the pair of light fluxes, based on outputs of the pair of light fluxes received by the light receiving element; a movement detection unit that detects an image movement amount caused by the optical system; and a focus detection unit that detects the focus adjustment state of the optical system by correcting the shift amount detected by the image shift detection unit, by using the image movement amount detected by the movement detection unit.

The movement detection unit may detect an image movement amount caused by the optical system when the image shift detection unit detects the shift amount.

The focus detection device may further include an angular velocity detection unit that detects angular velocity generated in the focus detection device, and the movement detection unit may detect the image movement amount, based on the angular velocity detected by the angular velocity detection unit, a difference in image detection time caused by the pair of light fluxes in the image shift detection unit, and a focusing distance of the optical system.

The focus detection device may further include an image pickup element that picks up an image formed by the optical system, and the movement detection unit may detect a shift amount between a plurality of images picked up by the image pickup element at different times, and detect the image movement amount based on the movement amounts of the plurality of images and the difference in image detection time caused by the pair of light fluxes in the image shift detection unit.

The light receiving element may be placed in an image pickup element that has a plurality of image pickup pixels two-dimensionally arranged therein, with the image pickup pixels each picking up an image formed by the optical system and outputting an image signal.

The light receiving element may include a plurality of focus detection pixels of charge storage type that receive the pair of light fluxes, and have a storage control unit that performs charge storage control sequentially on the plurality of focus detection pixels.

The present invention also provides an image pickup apparatus that includes the above focus detection device.

A focus detection method according to the present invention includes: preparing a light receiving element that receives a pair of light fluxes passing through different regions of a pupil of an optical system; detecting a shift amount caused by the pair of light fluxes, based on outputs of the pair of light fluxes received by the light receiving element; detecting an image movement amount caused by the optical system; and detecting a focus adjustment state of the optical system by correcting the detected shift amount with the detected image movement amount.

In the step of detecting the movement amount, the image movement amount caused by the optical system may be detected when the shift amount is detected.

The focus detection method may further include detecting angular velocity generated in the optical system. In the step of detecting the movement amount, the image movement amount may be detected based on the angular velocity detected through the angular velocity detection, a difference in image detection time caused by the pair of light fluxes in the step of detecting the image shift amount, and a focusing distance of the optical system.

An image pickup element that picks up an image formed by the optical system may be provided, and, in the step of detecting the movement amount, the shift amount between a plurality of images picked up by the image pickup element at different times may be detected. The image movement amount may be then detected based on the movement amount between the plurality of images and the difference in image detection time caused by the pair of light fluxes detected in the step of detecting the image shift amount.

An image pickup element that has a plurality of image pickup pixels arranged therein in a two dimensional array may be provided, with the image pickup pixels each picking up an image formed by the optical system and outputting an image signal. The light receiving element may be placed in the array of the plurality of image pickup pixels.

The light receiving element may include a plurality of focus detection pixels of charge storage type that receive the pair of light fluxes, and perform charge storage control sequentially on the plurality of focus detection pixels.

DESCRIPTION OF THE PREFERRED EMBODIMENTS

Figure 1:
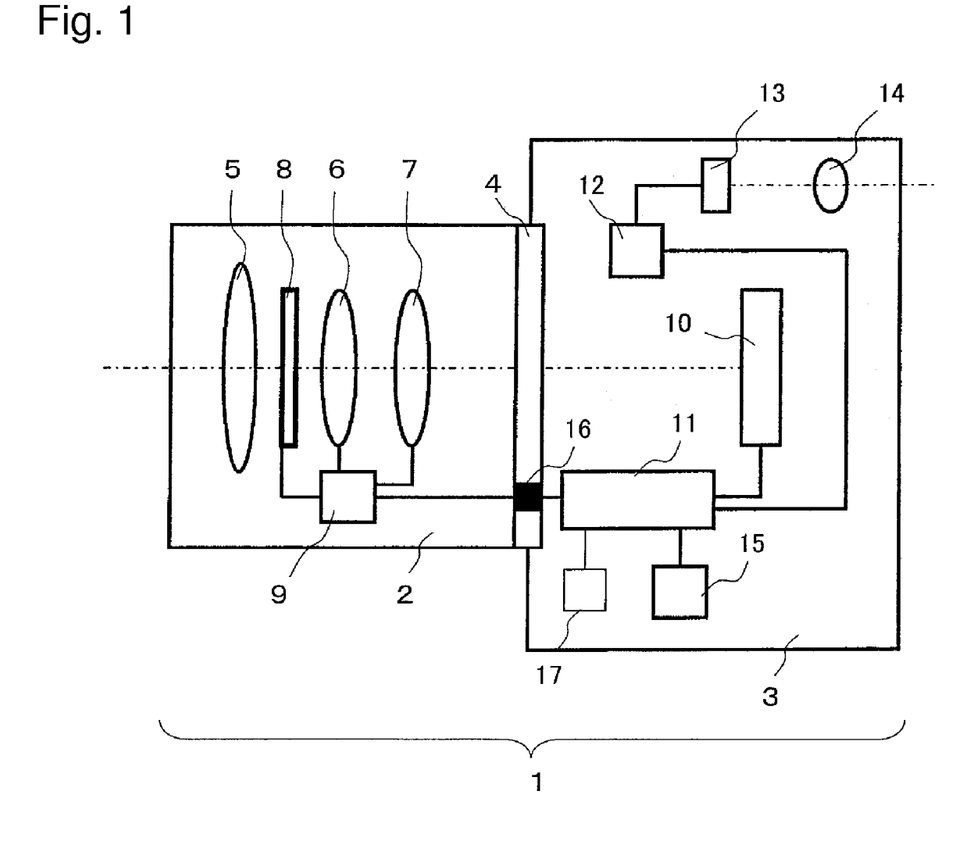
FIG. 1 is a horizontal cross-sectional view showing a structure of a camera in accordance with an embodiment.

As an example of a focus detection device and an image pickup apparatus of an embodiment of the present invention, a digital still camera with interchangeable lenses is described. The focus detection device and the image pickup apparatus of the present embodiment can be applied not only to a camera with interchangeable lenses, but also to a lens-incorporated camera. FIG. 1 is a horizontal cross-sectional view showing a structure of a camera of the present embodiment. A digital still camera 1 of the present embodiment includes an interchangeable lens unit 2 and a camera body 3. The interchangeable lens unit 2 is mounted to the camera body 3 via a mounting portion 4.

The interchangeable lens unit 2 includes a lens 5, a zoom lens 6, a focus lens 7, a diaphragm 8, and a lens drive control device 9. The lens drive control device 9 includes a microcomputer, a memory, and a drive control circuit, and the like (not shown). The lens drive control device 9 performs drive control for adjusting a focal point of the focus lens 7 and an aperture size of the diaphragm 8, and detects states of the zoom lens 6, the focus lens 7 and the diaphragm 8. The lens drive control device 9 also transmits lens information and receives camera information through communications with a body drive control device 11 described below. The diaphragm 8 forms an aperture with a variable aperture size around an optical axis, so as to adjust a light amount and defocus amount.

The camera body 3 includes an image pickup element 10, the body drive control device 11, a liquid crystal display element drive circuit 12, a liquid crystal display element 13, an eye lens 14, a memory card 15, and an angular velocity sensor 17. The image pickup element 10 is a CMOS two-dimensional image pickup element. Pixels for picking up images are two-dimensionally arranged on an image pickup face of the image pickup element 10. The pixels for focus detection are arranged at portions corresponding to a focus detection region in a region including the two-dimensionally arranged image pickup pixels on the image pickup face.

The body drive control device 11 includes a microcomputer, a memory, a drive control circuit, and the like (not shown). The body drive control device 11 repeatedly controls charge storage of the image pickup element 10, reads an image signal and a focus detection signal, performs a focus detecting operation based on the focus detection signal, and adjusts the focal point of the interchangeable lens unit 2. The body drive control device 11 further performs processing and recording of image signals, and controls camera operation. The body drive control device 11 also communicates with the lens drive control device 9 via an electric contact 16, to receive the lens information and transmit the camera information (the defocus amount and a diaphragm value).

The liquid crystal display element 13 functions as a liquid crystal view finder (EVF: electric view finder). The liquid crystal display element drive circuit 12 displays a through image on the liquid crystal display element 13, and a photographer can see the through image via the eye lens 14. The memory card 15 is an image storage that stores images picked up by the image pickup element 10. The angular velocity sensor 17 is a sensor that determines how many times the angular velocity sensor 17 revolves about a reference axis in a predetermined period of time. In the present embodiment, the angular velocity sensor 17 can detect the angular velocity θ of the camera body 3 and the interchangeable lens unit 2 revolving due to hand movement.

A subject image is formed on a light receiving face of the image pickup element 10 by a light flux that has passed through the interchangeable lens unit 2. The subject image is photoelectrically converted by the image pickup element 10, and an image signal and a focus detection signal are transmitted to the body drive control device 11.

The body drive control device 11 calculates the defocus amount, based on the focus detection signal from the focus detection pixels of the image pickup element 10, and transmits the defocus amount to the lens drive control device 9. The body drive control device 11 also performs processing on the image signal transmitted from the image pickup element 10, and stores the image signal into the memory card 15. The body drive control device 11 further transmits a through image signal sent from the image pickup element 10 to the liquid crystal display element drive circuit 12, and displays the through image on the liquid crystal display element 13. The body drive control device 11 also transmits diaphragm control information to the lens drive control device 9, so as to control the aperture of the diaphragm 8.

The lens drive control device 9 detects locations of the zoom lens 6 and the focus lens 7, and the diaphragm value of the diaphragm 8. The lens drive control device 9 also calculates a lens drive amount, based on the defocus amount received from the body drive control device 11, and moves the focus lens 7 to a focusing position in accordance with the lens drive amount. The lens drive control device 9 further drives the diaphragm 8 in accordance with the diaphragm value received from the body drive control device 11. The lens drive control device 9 also transmits the lens information such as a focusing length of the interchangeable lens unit 2 stored in a memory (not shown), to the body drive control device 11 via the electric contact 16.

The interchangeable lens unit 2 that includes various image pickup optical systems can be mounted to the camera body 3 via the mounting portion 4. Based on an output of the focus detection pixels incorporated into the image pickup element 10, the camera body 3 detects the focus adjustment state of the interchangeable lens unit 2.

Figure 2:
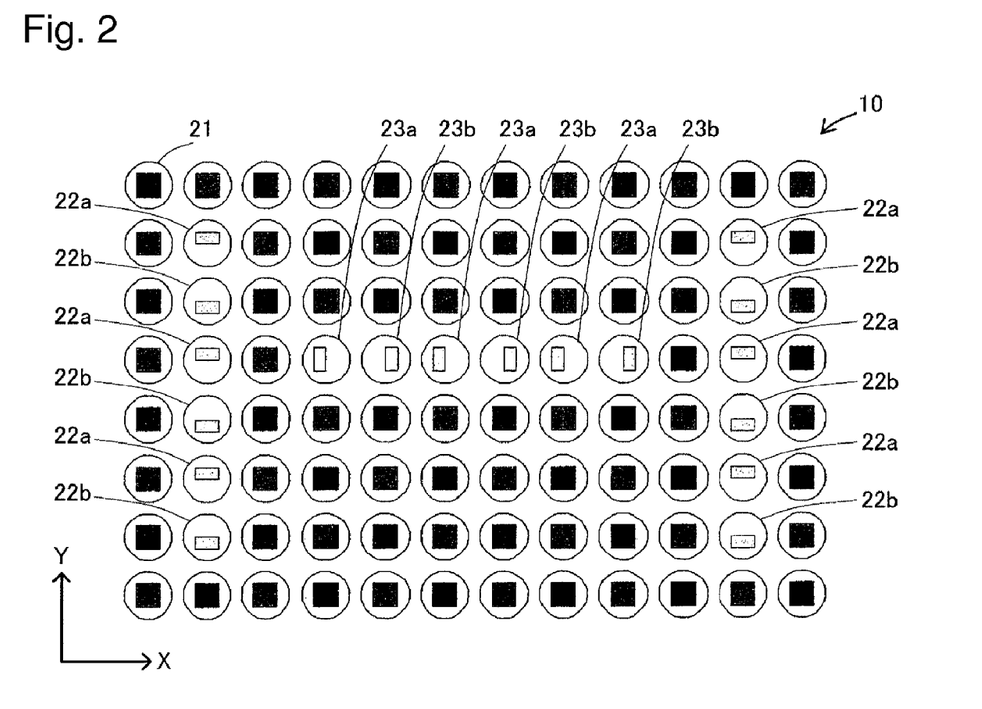
FIG. 2 is an enlarged view of a part of an image pickup element of the embodiment.

FIG. 2 is an enlarged view of a part of the image pickup element 10 of FIG. 1. As described above, image pickup pixels 21 are two-dimensionally arranged on the image pickup face of the image pickup element 10. At the portions corresponding to the focus detection locations in the image pickup face of the image pickup element 10, focus detection pixels 22a and 22b, instead of the image pickup pixels 21, are arranged in a Y-direction shown in FIG. 2, and focus detection pixels 23a and 23b, instead of the image pickup pixels 21, are arranged in an X-direction shown in FIG. 2. The image pickup pixels 21 and the focus detection pixels 22a, 22b, 23a, and 23b are each formed with a microlens and a photoelectric converter. The focus detection pixels 22a and 22b receive the focus detection light fluxes that have passed through a pair of upper and lower regions existing above an exit pupil of the interchangeable lens unit 2, and outputs a first signal and a second signal about a pair of images that are a first image and a second image. The focus detection pixels 23a and 23b receive the focus detection light fluxes that have passed through a pair of left and right regions existing above the exit pupil of the interchangeable lens unit 2, and outputs a first signal and a second signal about a pair of images that are a first image and a second image.

Based on a first signal string $\{a(i)\}=a(1), a(2), a(3), a(4), \ldots$ and a second signal string $\{b(i)\}=b(1), b(2), b(3), b(4), \ldots$ that are output from a pixel row of the focus detection pixels 22a and 22b, the body drive control device 11 detects the focus adjustment state of the interchangeable lens unit 2 in a transverse direction of an image capturing screen (the Y-direction in FIG. 2). Likewise, based on a first signal string $\{a(i)\}=a(1), a(2), a(3), a(4), \ldots$ and a second signal string $\{b(i)\}=b(1), b(2), b(3), b(4), \ldots$ that are output from a pixel row of the focus detection pixels 23a and 23b, the body drive control device 11 detects the focus adjustment state of the interchangeable lens unit 2 in a longitudinal direction of the image capturing screen (the X-direction in FIG. 2).

The method for detecting shift of the pair of images based on the first signal string $\{a(i)\}$ (i=1, 2, 3, ...) and the second signal string $\{b(i)\}$ (i=1, 2, 3, ...) is now described. First, a correlation between the first signal string $\{a(i)\}$ and the second signal string $\{b(i)\}$ or a correlation C(N) between the pair of images is determined according to the following equation:

$$C(N)=|\Sigma a(i)-b(j)|,$$

$$j-i=N \quad (1)$$

where $\Sigma$ represents a total sum of i=pL through qL, and N represents a shift number.

Of the correlations C(N) obtained discretely according to the equation (1), the correlation that becomes the smallest when the shift amount is N is C0, and the correlation obtained when the shift amount is N−1 is Cr, and the correlation obtained when the shift amount is N+1 is Cf. Based on the correlations Cr, C0, and Cf corresponding to the shift amounts (N−1), N, and (N+1), an accurate shift amount Na is determined according to the following equations:

$$DL=0.5*(Cr-Cf) \quad (2)$$

$$E=MAX\{Cf-C0, Cr-C0\} \quad (3)$$

$$Na=N+DL/E \quad (4)$$

A correction amount const (constant) corresponding to the focus detection position is added to the shift amount Na, to obtain an image shift Δn (=Na+const) on the focus detection face. Further, the image shift Δn is multiplied by a constant Kf that depends on a detection opening angle, and is thus converted into a defocus amount Df.

$$Df=Kf*\Delta n \quad (5)$$

Figure 3:
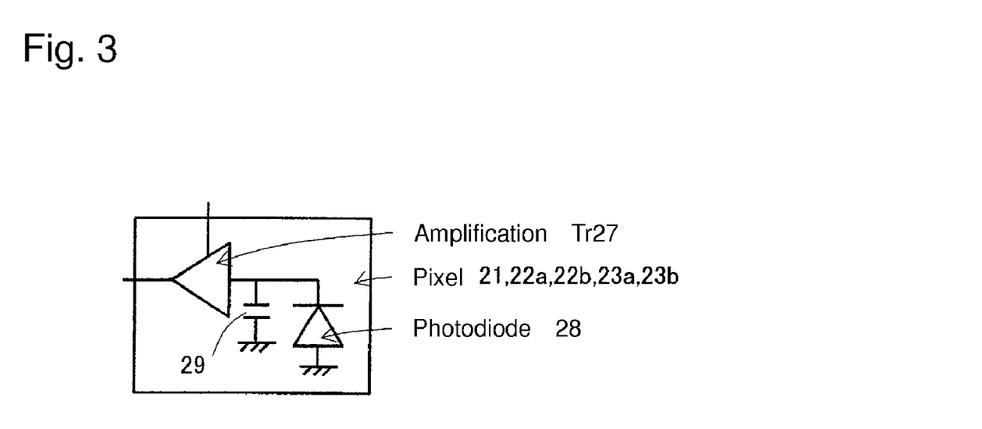
FIG. 3 shows a circuit structure of image pickup pixels and focus detection pixels in detail.
Figure 4:
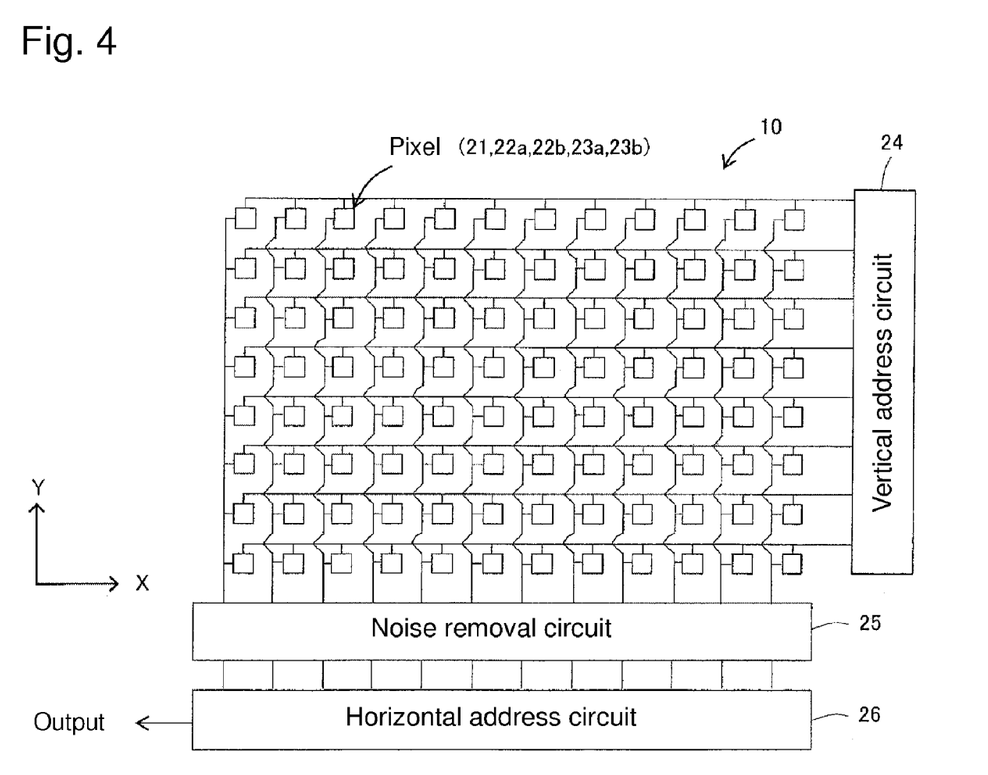
FIG. 4 shows a circuit structure of the image pickup element of the embodiment.

FIG. 3 shows a circuit structure of the image pickup pixels and the focus detection pixels in detail. FIG. 4 shows a circuit structure of the image pickup element 10 of FIGS. 1 and 2. As shown in FIG. 3, the image pickup pixels 21 and the focus detection pixels 22a, 22b, 23a, and 23b are each formed with an amplification transistor 27, a photodiode 28, and a capacitor 29. As shown in FIG. 4, where the image pickup element 10 is a CMOS image pickup element, pixels are designated by a vertical address circuit 24 by the row, and charge storing and pixel output reading are sequentially performed by the row in the Y-direction shown in FIG. 4, from an uppermost row to a lowermost row (line reading). The pixel outputting by the row is performed by a horizontal address circuit 26 via a noise removal circuit 25. When the pixel signal reading by the row is performed, a time lag ΔT is caused in each row. The time lag ΔT is of an order of tens of μs.

Since the image pickup element 10 of the present embodiment is a solid-state image pickup element of a CMOS type, a focus detection pixel string placed in the transverse direction (the X-direction) of the image capturing screen (the focus detection pixels 23a and 23b shown in FIG. 2) is arranged in the same direction as the line reading direction of the image pickup signals of the image pickup element 10. Accordingly, synchronism in charge storing time can be maintained between the focus detection pixels 23a and 23b. However, a focus detection pixel string placed in a direction such as the longitudinal direction (the Y-direction) other than the transverse direction of the image capturing screen (the focus detection pixels 22a and 23a shown in FIG. 2) is arranged in a different direction from the line reading direction of the image pickup signals of the image pickup element 10. As a result, synchronism in charge storing time cannot be maintained between the focus detection pixels 22a and 22b.

Therefore, when image movement is caused while charge storing is performed on the focus detection pixel string arranged in a direction other than the transverse direction of the image capturing screen or on the focus detection pixel string arranged in the direction without synchronism in charge storing time, shift due to the image movement is caused between the first image and the second image or between the first signal string $\{a(i)\}$ and the second signal string $\{b(i)\}$. As a result, the image shift amount between the first image and the second image cannot be accurately calculated, and focus detection accuracy is degraded.

Figure 5:
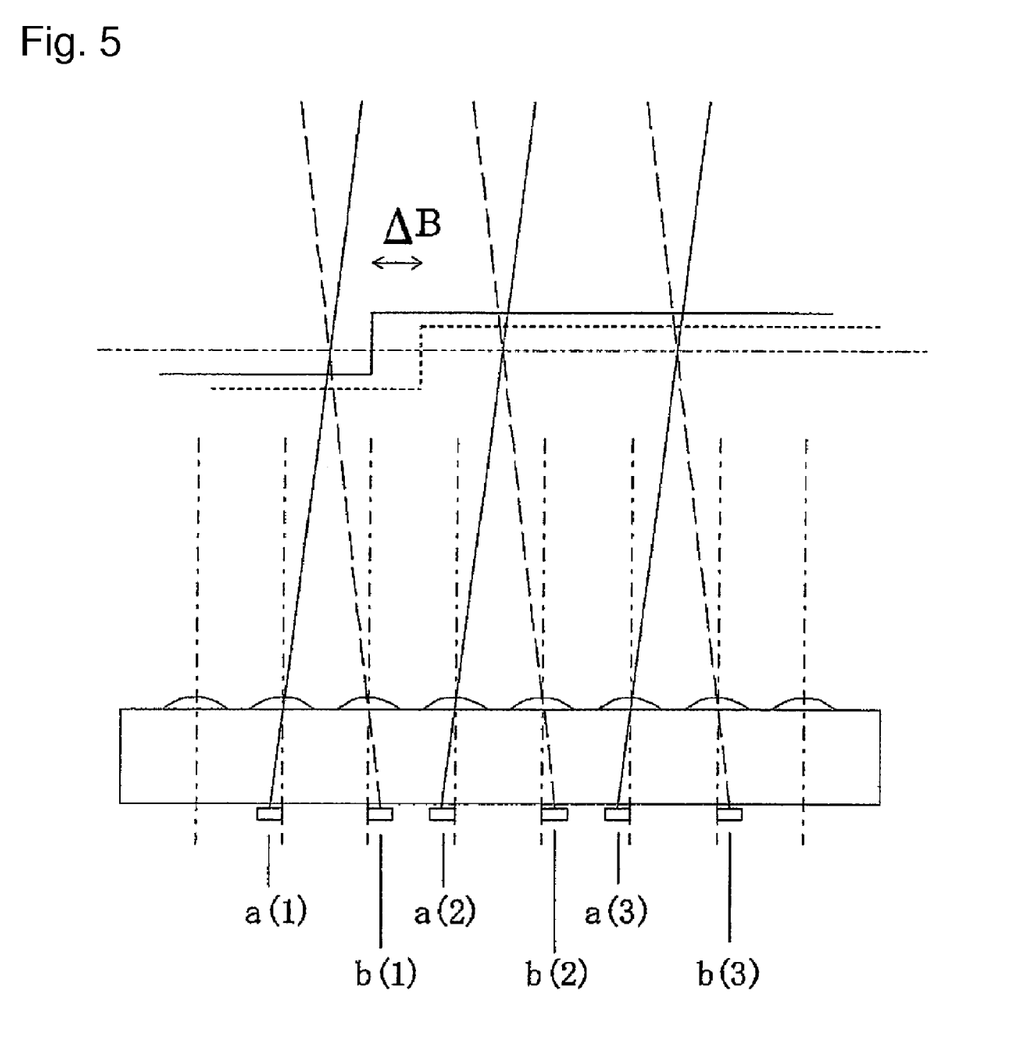
FIG. 5 is a diagram for describing degradation of focus detection accuracy due to hand movement in a focus detection pixel array without synchronism in charge storing time.

FIG. 5 is a diagram for explaining degradation of the focus detection accuracy due to hand movement in a focus detection pixel array without synchronism in the charge storing time in an aligning direction. FIG. 5 shows a case where image shift with a movement amount ΔB is caused due to hand movement or movement of the subject to be captured during a charge storing period of the focus detection pixels. If an arranging direction of the focus detection pixels a(1), b(1), a(2), b(2), a(3), b(3), ... is a direction without synchronism in charge storing time, there is a time lag ΔT in charge storage start time in each row. As a result, an error equivalent to the movement amount ΔB is caused in the image shift due to the image shift caused during the time lag ΔT in the charge storage start time between the first image signal string a(1), a(2), a(3), ... and the second image signal string b(1), b(2), b(3) ....

In the present embodiment, the image shift error due to the movement amount ΔB is corrected in the following manner. First, the body drive control device 11 reads the angular velocity θ in the aligning direction of the focus detection pixels 22a and 22b from the angular velocity sensor 17, in synchronization with a read time of a center portion (the portion that has the largest contribution to the shift detection in the array) of the array of the focus detection pixels 22a and 22b aligned in a direction different from the aligning direction in which the charge storing and the read control are simultaneously performed on the image pickup element 10, or the longitudinal direction (Y-direction) shown in FIG. 2. Based on the angular velocity θ, the time lag ΔT in the charge storage start time, and a focusing length f acquired from the lens drive control device 9, the movement amount ΔB is determined according to the following equation:

$$B = f \cdot \theta \cdot \Delta T \quad (6)$$

In the array of the focus detection pixels 22a and 22b arranged in the longitudinal direction in FIG. 2, an image shift amount Δn is determined based on the first signal string {a(i)} and the second signal string {b(i)} output from the subject pixel array, as described above. The body drive control device 11 determines a true image shift amount Δn' by correcting the image shift value Δn with the movement amount ΔB:

$$\Delta n' = \Delta n + \Delta B \quad (7)$$

Further, with the use of the following equation, instead of the equation (5), a defocus amount Df is calculated by multiplying the image shift amount Δn' correcting the image movement by the constant Kf depending on the detection opening angle:

$$Df' = Kf \cdot \Delta n' \quad (8)$$

Modification of the Embodiment

In the above-described embodiment, focus detection pixels each having a photoelectric converter provided under a microlens have been described. However, it is also possible to use focus detection pixels each having a pair of photoelectric converters provided under each one microlens. The pair of photoelectric converters receive focus detection light fluxes that have passed through a pair of different regions of the exit pupil of the image capturing lens. If there is a time lag in the charge storing and pixel output reading between an output a(i) and an output b(i) of the pair of photoelectric converters corresponding to the pair of pupil regions, the focus detection accuracy can be increased by correcting the image shift error due to the image movement amount ΔB in the above described manner.

Figure 6:
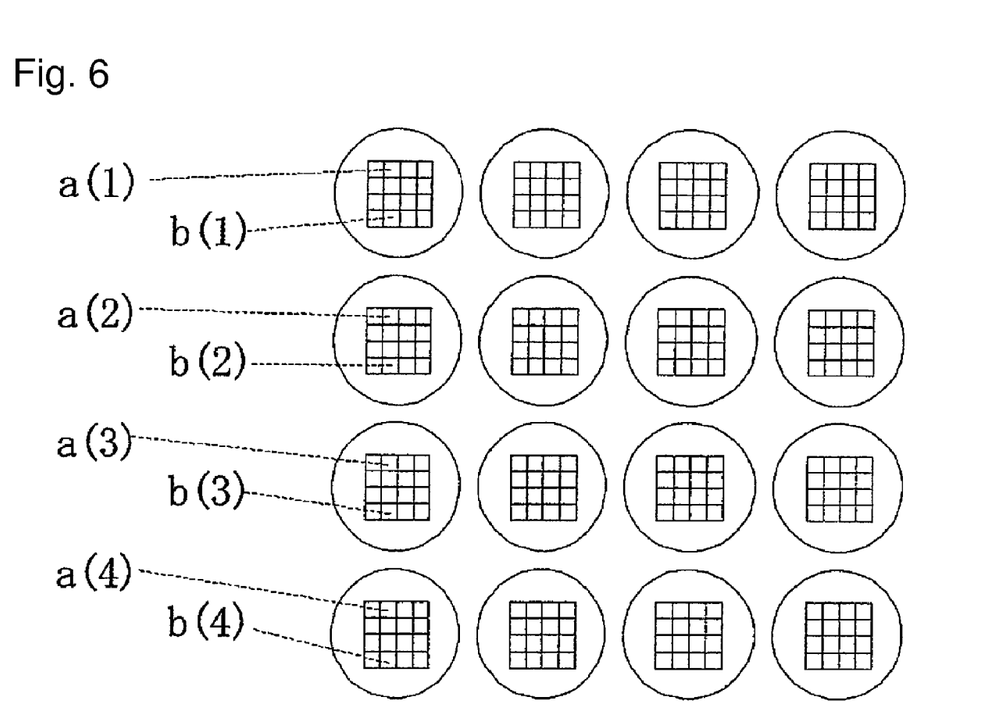
FIG. 6 shows a structure of an image pickup element of a modification.

As shown in FIG. 6, it is also possible to use focus detection pixels each having a number of photoelectric converters under each one microlens, so as to obtain a number of pupil divisional data sets through sequential storage control performed on the number of photoelectric converters. If there is a time lag in the charge storing and pixel output reading between the output a(i) and the output b(i) of pixels forming a pair, the focus detection accuracy can also be increased by correcting the image shift error due to the image movement amount ΔB in the above described manner.

In the above-described embodiment, an image pickup element having a microlens array has been described. In a focus detection device of a divided pupil re-imaging type, however, the focus detection accuracy can also be increased by correcting the image shift error due to the image movement amount ΔB in the above described manner, if there is a time lag in charge storing and pixel output reading between the outputs a(i) and b(i) of the photoelectric converters corresponding to the pair of regions located above the exit pupil of the image capturing lens.

In FIG. 2, the image pickup pixels 21 are placed around the focus detection pixels 22a and 22b. A region capable of capturing a subject image (a peripheral imaging region) is located around the focus detection region in which the focus detection pixels 22a and 22b are placed. It is possible to estimate the movement amount in the image shift direction of focus detection, based on differences in the position between the subject image captured at difference times in the peripheral imaging region. More specifically, image capture is carried out twice with the image pickup pixels 21, and reading of the focus detection pixels 22a and 22b is performed at a time between the two image pickup operations. The images obtained through the two image pickup operations are compared with each other, and the image movement of the image captured by the second image pickup operation with respect to the image captured by the first image pickup operation is detected. It becomes apparent from the comparison result that the image captured by the second image pickup operation has moved with respect to the image captured by the first image pickup operation by ΔBI in the aligning direction of the focus detection pixels 22a and 22b. Here, the movement amount ΔB' for correcting the image shift amount Δn caused during the time lag ΔT in the charge storage start time between the first signal string {a(i)} and the second signal string {b(i)} from the focus detection pixels can be determined according to the following equation with the use of ΔBI:

$$\Delta B' = \Delta BI \cdot \Delta T / (t2 - t1) \quad (9)$$

where t2 represents a center time of an exposure time in the second image pickup operation, and t1 represents the center time of the exposure time in the first image pickup operation.

The true image shift amount Δn' is determined with the use of the movement amount ΔB', instead of the movement amount ΔB of the equation (7).

To detect the image shift due to the movement amount ΔBI, it is possible to use the same method as the method of detecting image shift in focus detection. In such a case, the image shift due to the detected movement amount ΔBI contains both hand movement and movement of the subject.

In this example, images are captured at time t1 and time t2, with the focus detection time being interposed in between. However, the focus detection time may be the same as time t1 or time t2. Also, images captured at two different times are used in this example, but a prediction accuracy may be increased by capturing more images at other times.

What is claimed as new and is desired to be secured by Letters Patent of the United States is:

1. A focus detection device comprising:
    a light receiving element that receives a pair of light fluxes passing through different regions of a pupil of an optical system;
    an image shift detection unit that detects an image shift amount caused by the pair of light fluxes, based on outputs of the pair of light fluxes received by the light receiving element;
    a movement detection unit that detects an image movement amount caused by the optical system; and
    a focus detection unit that detects a focus adjustment state of the optical system by correcting the shift amount detected by the image shift detection unit, by using the image movement amount detected by the movement detection unit.

2. The focus detection device according to claim 1, wherein the movement detection unit detects an image movement amount caused by the optical system when the image shift detection unit detects the shift amount.

3. The focus detection device according to claim 1, further comprising
    an angular velocity detection unit that detects angular velocity generated in the focus detection device,
    wherein the movement detection unit detects the image movement amount, based on the angular velocity detected by the angular velocity detection unit, a difference in image detection time caused by the pair of light fluxes in the image shift detection unit, and a focusing distance of the optical system.

4. The focus detection device according to claim 1, further comprising
an image pickup element that picks up an image formed by the optical system,
wherein the movement detection unit detects a shift amount between a plurality of images picked up by the image pickup element at different times, and detects the image movement amount based on the movement amounts of the plurality of images and a difference in image detection time caused by the pair of light fluxes in the image shift detection unit.

5. The focus detection device according to claim 1, wherein the light receiving element is placed in an image pickup element that has a plurality of image pickup pixels two-dimensionally arranged therein, the image pickup pixels each picking up an image formed by the optical system and outputting an image signal.

6. The focus detection device according to claim 5, wherein the light receiving element includes a plurality of focus detection pixels of charge storage type that receive the pair of light fluxes, and has a storage control unit that performs charge storage control sequentially on the plurality of focus detection pixels.

7. An image pickup apparatus comprising
the focus detection device according to claim 1.

8. A focus detection method comprising:
preparing a light receiving element that receives a pair of light fluxes passing through different regions of a pupil of an optical system;
detecting a shift amount caused by the pair of light fluxes, based on outputs of the pair of light fluxes received by the light receiving element;
detecting an image movement amount caused by the optical system; and
detecting a focus adjustment state of the optical system by correcting the detected shift amount with the detected image movement amount.

9. The focus detection method according to claim 8, wherein the step of detecting the movement amount includes detecting an image movement amount caused by the optical system when the shift amount is detected.

10. The focus detection method according to claim 8, further comprising
detecting angular velocity generated in the optical system,
wherein the step of detecting the movement amount includes detecting the image movement amount, based on the angular velocity detected through the angular velocity detection, a difference in image detection time caused by the pair of light fluxes in the step of detecting the image shift amount, and a focusing distance of the optical system.

11. The focus detection method according to claim 8, wherein:
an image pickup element that picks up an image formed by the optical system is provided; and
the step of detecting the movement amount includes detecting a shift amount between a plurality of images picked up by the image pickup element at different times, and detecting the image movement amount based on the movement amount between the plurality of images and a difference in image detection time caused by the pair of light fluxes detected in the step of detecting the image shift amount.

12. The focus detection method according to claim 8, wherein:
an image pickup element that has a plurality of image pickup pixels arranged therein in a two-dimensional array is provided, the image pickup pixels each picking up an image formed by the optical system and outputting an image signal; and
the light receiving element is placed in the array of the plurality of image pickup pixels.

13. The focus detection method according to claim 12, wherein the light receiving element includes a plurality of focus detection pixels of charge storage type that receive the pair of light fluxes, and perform charge storage control sequentially on the plurality of focus detection pixels.

* * * * *